US011491928B2

United States Patent
Menez et al.

(10) Patent No.: US 11,491,928 B2
(45) Date of Patent: Nov. 8, 2022

(54) CONNECTOR INCLUDING A SHELL WITH AN ORIENTABLE CONDUIT AND A METHOD FOR MOUNTING A CONNECTOR

(71) Applicant: APTIV TECHNOLOGIES LIMITED, St. Michael (BB)

(72) Inventors: Frédéric Menez, Hermeray (FR); Prasanna Ramakrishnan, Chennai Tamilnadu (IN); Rama krishna Manne, Guntur Andhra Pradesh (IN)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 245 days.

(21) Appl. No.: 16/913,057

(22) Filed: Jun. 26, 2020

(65) Prior Publication Data
US 2020/0406838 A1    Dec. 31, 2020

(30) Foreign Application Priority Data

Jun. 28, 2019   (FR) ...................... 1907217

(51) Int. Cl.
*B60R 16/02*     (2006.01)
*H02G 3/04*      (2006.01)
*H02G 3/06*      (2006.01)

(52) U.S. Cl.
CPC ....... *B60R 16/0215* (2013.01); *H02G 3/0487* (2013.01); *H02G 3/0608* (2013.01); *B60K 2370/44* (2019.05)

(58) Field of Classification Search
CPC ... B60R 16/0222; B60R 16/0207; H01B 7/17; H01B 11/18; H01B 7/02; H01B 7/2825;
(Continued)

(56) References Cited

U.S. PATENT DOCUMENTS 1,083,756 A  *  1/1914  Phelps ................. F16L 23/036
                                                   285/414
4,863,396 A  *  9/1989  Johnson ............... H01R 13/508
                                                   439/446
(Continued)

FOREIGN PATENT DOCUMENTS

EP    0 818 854 A1    1/1998
EP    1 037 324 A1    9/2000

OTHER PUBLICATIONS

Chinese Office Action for Chinese Application No. 202010597724.4 dated Jul. 28, 2021.

(Continued)

*Primary Examiner* — Krystal Robinson
(74) *Attorney, Agent, or Firm* — Carlson, Gaskey & Olds, P.C.

(57) ABSTRACT

An illustrative example embodiment of a connector shell includes a connector cover and a cable-guiding sleeve having a curved conduit. The cover and the cable-guiding sleeve are made up of two separate elements. The cable-guiding sleeve is mounted on the cover so as to be rotatable about an axis of rotation. The cable-guiding sleeve and the cover comprise means for blocking the rotation of the cable-guiding sleeve on the cover in at least two different pre-set angular positions about the axis of rotation. These blocking means comprise shapes that engage with each other in a complementary way, and that are able to release each other and allow the passage from one angular position to the next.

13 Claims, 5 Drawing Sheets

(58) Field of Classification Search
CPC ...... H01B 7/2813; H01B 7/40; H01B 13/012; H01B 7/292; H01B 11/1808; H01B 7/0045; H01B 17/583; H01B 7/282; H01B 7/0892; H01B 9/02; H01B 11/06; H01B 11/1091; H01B 11/1826; H01B 11/1834; H01B 11/20; H01B 7/18; H01B 7/1875; H01B 7/30; H01B 7/38; H01B 9/006; H01B 7/28; H01B 7/29; H01B 11/22; H01B 13/016; H01B 3/441; H01B 7/0009; H01B 7/009; H01B 11/203; H01B 13/01209; H01B 17/38; H01B 3/30; H01B 7/04; H01B 7/046; H01B 7/226; H01B 9/021; H01B 11/00; H01B 13/0036; H01B 19/00; H01B 5/105; H01B 7/00; H01B 7/2806; H01B 9/00; H01B 9/005; H01B 11/1895; H01B 13/22; H01B 13/24; H01B 15/00; H01B 17/58; H01B 7/0216; H01B 7/0861; H01B 7/183; H01B 7/295; H01B 11/005; H01B 12/02; H01B 13/00; H01B 13/01236; H01B 13/02; H01B 13/0207; H01B 13/14; H01B 13/26; H01B 17/26; H01B 17/308; H01B 3/307; H01B 7/048; H01B 7/06; H01B 7/184; H01B 7/225; H01B 7/24; H01B 7/42; H01B 7/421; H01B 7/423; H01B 1/023; H01B 11/02; H01B 11/10; H01B 11/1813; H01B 11/1891; H01B 12/12; H01B 13/0023; H01B 13/01245; H01B 13/01254; H01B 13/0214; H01B 13/0235; H01B 13/062; H01B 13/065; H01B 13/0891; H01B 13/16; H01B 13/165; H01B 13/228; H01B 17/00; H01B 17/06; H01B 3/105; H01B 5/002; H01B 7/08; H01B 7/0853; H01B 7/1845; H01B 7/1895; H01B 7/22; H01B 7/228; H01B 7/36; H01B 7/368; H01B 7/428; H01B 9/024; H01B 7/0823; H01B 1/02; H01B 1/22; H01B 7/0018; H01B 7/0838; H01B 7/361; H01B 13/01227; H01B 13/01281; H01B 3/00; H01B 3/44; H01B 7/324; H01B 7/365; H01B 7/426; H02G 3/32; H02G 3/123; H02G 3/388; H02G 3/30; H02G 1/14; H02G 3/0481; H02G 3/0487; H02G 3/0608; H02G 3/0691; H02G 3/22; H02G 11/00; H02G 15/182; H02G 3/04; H02G 3/0406; H02G 3/0456; H02G 3/0462; H02G 3/0475; H02G 3/06; H02G 3/263; H02G 11/003; H02G 15/10; H02G 15/18; H02G 3/00; H02G 3/03; H02G 3/0468; H02G 3/0493; H02G 3/08; H02G 3/088; H02G 3/105; H02G 3/24; H02G 3/26; H02G 3/36; H02G 9/10

See application file for complete search history.

(56) References Cited

U.S. PATENT DOCUMENTS

| | | | | |
|---|---|---|---|---|
| 5,126,507 | A | * | 6/1992 | Kirma .................. H02G 3/0468 174/72 A |
| 5,160,811 | A | * | 11/1992 | Ritzmann ............ H02G 3/0691 285/236 |
| 5,347,603 | A | | 9/1994 | Belenkiy et al. |
| 5,620,334 | A | * | 4/1997 | Quillet ............... H01R 13/5804 439/471 |
| 7,537,478 | B2 | | 5/2009 | Foltz et al. |
| 2008/0188120 | A1 | * | 8/2008 | Tsuji .................. H01R 13/5841 439/470 |
| 2009/0020309 | A1 | | 1/2009 | Foltz et al. |
| 2010/0279529 | A1 | * | 11/2010 | Ng Vern Shen ... H01R 13/5812 439/153 |
| 2019/0074651 | A1 | | 3/2019 | Wang |

OTHER PUBLICATIONS

French Search Report for Application No. FR 1907217 dated May 3, 2020.

* cited by examiner

CONNECTOR INCLUDING A SHELL WITH AN ORIENTABLE CONDUIT AND A METHOD FOR MOUNTING A CONNECTOR

CROSS REFERENCE TO RELATED APPLICATION

This application claims priority to French Patent Application No. FR1907217, filed on Jun. 28, 2019.

TECHNICAL FIELD

The invention relates to the field of automotive connector systems. More particularly, the invention relates to connectors equipped with a cable-guiding shell.

BACKGROUND

Connectors equipped with a cable-guiding shell are well known. A cable-guiding shell is generally used to keep cables together on egress from the connector, to orient them in a pre-set direction and/or to allow a potential pull exerted on the cables to be redirected. The patent publication U.S. Pat. No. 4,863,396A discloses an example of relatively complex cable guide.

According to another example, patent publication U.S. Pat. No. 7,537,478B2 describes a connector equipped with a shell comprising a connector cover and a cable-guiding sleeve comprising three curved conduits allowing the cables to be oriented with three different orientations. The cover is adapted to be mounted at the rear of a connector. The cable-guiding sleeve is hinged to the cover using hinges.

An alternative to prior-art connectors equipped with a cable-guiding shell allowing multiple orientations is proposed below.

SUMMARY

An illustrative example embodiment of a connector includes a connector cover and a cable-guiding sleeve comprising a curved conduit. The cover is adapted to be mounted at the rear of a connector. The cover and the cable-guiding sleeve are made up of two separate elements. The cable-guiding sleeve is mounted on the connector cover so as to be rotatable about an axis of rotation essentially perpendicular to a rear face of the connector. The cable-guiding sleeve and the cover comprise means for blocking the rotation of the cable-guiding sleeve on the cover in at least two different pre-set angular positions about the axis of rotation. These blocking means in particular comprise shapes that engage with each other in a complementary way. These shapes are furthermore adapted to release each other and allow the passage from one angular position to the next.

Thus, the shell allows the egressing cables to be oriented with various orientations by rotating a cable-guiding sleeve comprising a single gutter or conduit, rather than, for example, using a cable-guiding sleeve that is not orientable but that possesses a plurality of conduits.

This cable-guiding shell optionally comprises one or more of the following features, considered each independently from one another, or each in combination with one or more others:

the blocking means comprise at least two notches formed in one of the elements comprising the cable-guiding sleeve and the cover, and a tooth adapted to interact with each of these notches, the tooth being elastically connected to the other of these elements; for example, a notch is formed between two ridges on the ring and the cable-guiding sleeve comprises eight notches, two neighbouring notches being spaced apart angularly by 45° about the axis of rotation;

the cable-guiding sleeve comprises a ring and the cover comprises a neck, the ring and the neck being coaxial with the axis of rotation, the ring comprising the notches and inserting into the neck on an internal surface from which the tooth protrudes;

the cable-guiding sleeve comprises a circular locking bead that is coaxial with the axis of rotation, and the cover comprises at least one flexible locking tab equipped with a locking surface that retracts during the insertion, in an insertion direction parallel to the axis of rotation, of the ring into the neck, this locking surface interacting with the locking bead to retain the cable-guiding sleeve on the cover, when a force is exerted on the cable-guiding sleeve, in a direction opposite to the insertion direction;

the locking bead comprises at least one orientation recess aligned with a notch along a direction parallel to the axis of rotation, for the passage of the tooth during the insertion of the ring into the neck;

the cable-guiding sleeve is adapted to receive a plurality of cables;

the cover comprises a segment for fastening to a connector casing, the cross section of which perpendicular to the axis of rotation is essentially rectangular; and the cover comprises a face for entry and a face for egress of the cables, these two faces lying essentially perpendicular to the axis of rotation, and the cable-guiding sleeve comprises a face for entry of the cables lying essentially perpendicular to the axis of rotation and a face for egress of the cables, essentially perpendicular to its entry face.

Another aspect relates to a method for mounting a connector with a shell such as mentioned above. According to an illustrative example embodiment of the method, a plurality of electrical contacts are each respectively inserted into one cavity in a connector casing, each of these contacts being connected to a cable extending to a rear face of the connector casing. The shell is mounted, with or without its cable-guiding sleeve, on the connector casing, with the cables passing, essentially parallel to the axis of rotation, through the interior of the cover. The cable-guiding sleeve is placed in one of the pre-set angular positions. And, the cables are placed in the curved conduit.

According to another aspect, the invention relates to a connector comprising a casing and a shell such as mentioned above. In this connector, the shell comprises flexible tabs equipped with windows adapted to interact with complementary protuberances provided on the casing, so as to retain the shell on the casing in a fixed position.

BRIEF DESCRIPTION OF THE DRAWINGS

Other features, aims and advantages of disclosed embodiments will become apparent on reading the following detailed description, with reference to the appended drawings, which are given by way of non-limiting example.

DETAILED DESCRIPTION

Figure 1:
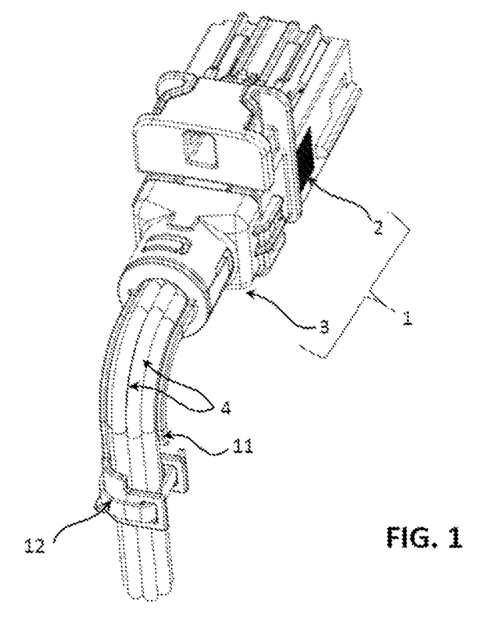
FIG. 1 schematically shows, in perspective, an example of an embodiment of a connector.
Figure 6:
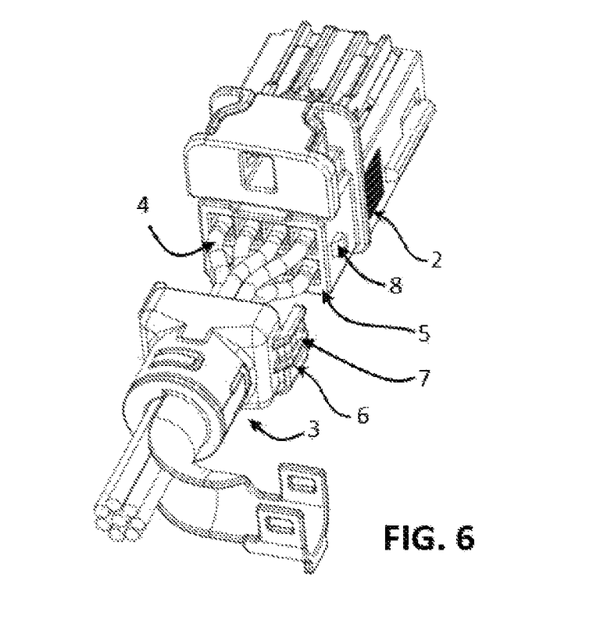
FIG. 6 schematically shows in perspective a step of the method for mounting the shell on the connector shown in FIG. 1.

FIG. 1 shows an example of a connector 1. It comprises a casing 2 and a connector shell 3. In a known way, the casing 2 comprises cavities in each of which is housed a contact. Each contact is electrically connected to a free end of a wire or of a cable 4. In the rest of this document, the term "cable" will be used to designate either an electrical wire or an electrical cable or an optical fibre. All of the cables 4 connected to the contacts egress via the rear face 5 of the casing 2 and pass through the shell 3 mounted on the casing 2 (see FIG. 6). The shell 3 is retained on the casing 2, in a fixed position, using four flexible fastening tabs 6 that are each equipped with a window 7 adapted to interact with a complementary protuberance 8 provided on the casing 2.

Figure 2:
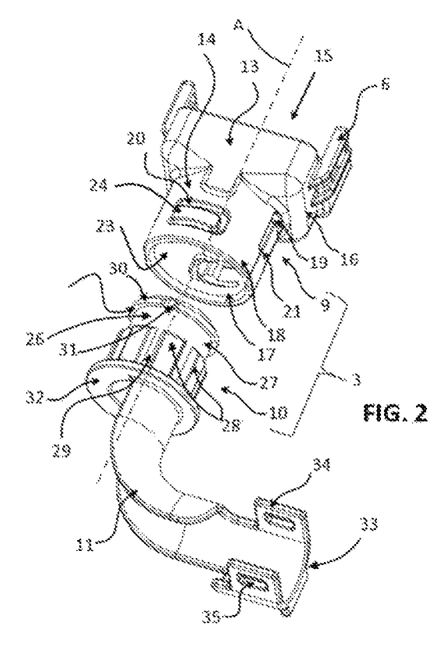
FIG. 2 schematically shows, in perspective, the shell of the connector shown in FIG. 1, before a cable-guiding sleeve is mounted on the cover.

The shell 3 comprises a connector cover 9 and a cable-guiding sleeve 10 comprising a curved conduit 11 (see FIG. 2). The cables 4 on passing through the shell 3 form a harness. The conduit 11 comprises, at its free end, fastening means allowing the cables 4 to be attached, together and to the conduit 11, using a cable tie 12, in order to guide the harness in the conduit (see FIG. 1).

As shown in FIG. 2, the cover 9 comprises a fastening segment 13 and a neck 14.

The fastening segment 13 is essentially parallelepipedal. The fastening segment 13 comprises an entry face 15 and four lateral faces 16. The entry face 15 is essentially rectangular. Two fastening tabs 6 are placed on the exterior surface of two opposite lateral faces 16.

The neck 14 is essentially tubular and symmetric with respect to a central axis. The neck 14 is coaxial with the central axis. The neck 14 comprises a face 17 for egress of the cables 4. This egress face 17 has an essentially round opening. The cover therefore comprises a face 15 for entry and face 17 for egress of the cables 4. These two faces 15, 17 lie essentially perpendicular to a longitudinal direction parallel to the central axis. As described below, the central axis also corresponds to the axis of rotation A of the cable-guiding sleeve 10 with respect to the cover 9. The neck 14 comprises a wall 18 containing two longitudinal apertures 19 and two circularly arcuate apertures 20.

Figures 4, 4A:
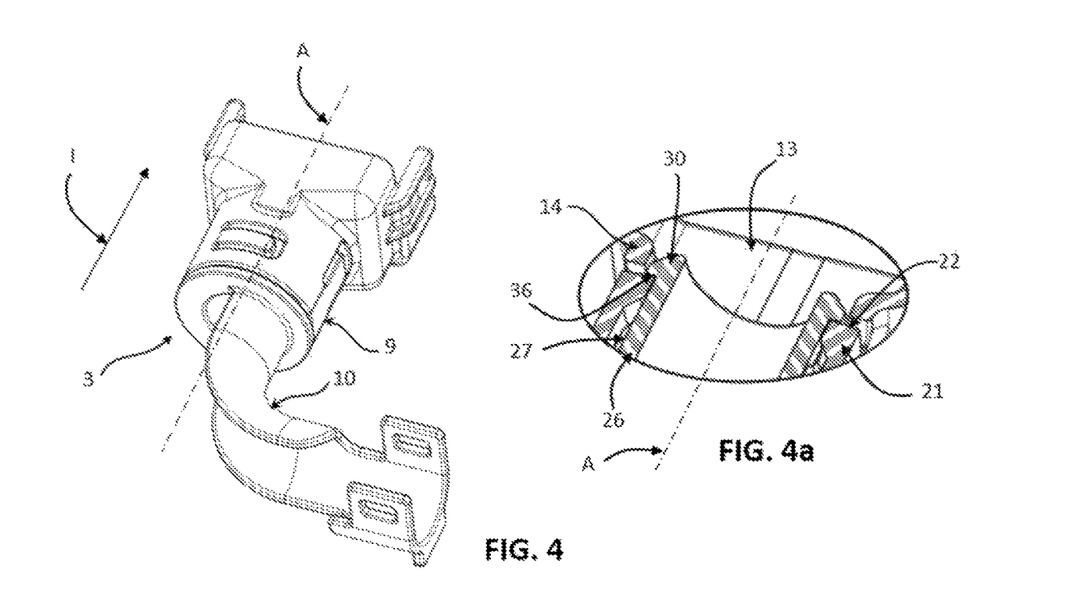
FIG. 4 schematically shows in perspective the shell of the connector shown in FIG. 1, after the cable-guiding sleeve has been mounted on the cover.
FIG. 4a is an enlarged view of the means for locking the cable-guiding sleeve on the cover.

The two longitudinal apertures 19 are radially opposite and located on the same side of the cover 9 as the fastening tabs 6. The two longitudinal apertures 19 lie parallel to the axis of rotation A. A flexible locking tab 21 is housed in each of the two longitudinal apertures 19. Each locking tab 21 extends longitudinally parallel to the axis of rotation A between an end connected to the wall 18 of the neck 14, on one edge of a longitudinal aperture 19, and a free end, located in proximity to the fastening segment 13. In proximity to its free end, each locking tab 21 is equipped with a locking surface 22 that protrudes from the internal surface 23 of the wall 18 of the neck 14 (see FIG. 4a). This locking surface 22 is essentially perpendicular to the axis of rotation A and directed away from the fastening segment 13.

Figure 2A:
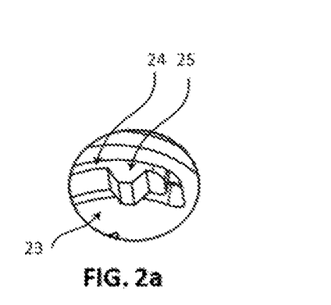
FIGS. 2a and 2b are enlarged views of a tooth of the blocking means and of an orientation recess in the locking bead, respectively.
Figure 2B:
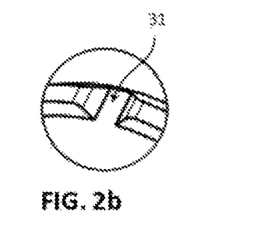

The two circularly arcuate apertures 20 are radially opposite and essentially at 90 degrees to the locking tabs 21 (see FIG. 2). Each circularly arcuate aperture 20 extends over a circular arc essentially centred on the axis of rotation A. A blocking tab 24 extends, in each of the circularly arcuate apertures 20, between an end connected to the wall 18 of the neck 14, on one edge of a circularly arcuate aperture 20, and a free end. Each blocking tab 24 extends over a circular arc essentially centred on the axis of rotation A. The two blocking tabs 24 are oriented, between their fixed end and their free end, in the same direction, for example in the clockwise direction. The free end of each blocking tab 24 is equipped with a tooth 25 that protrudes from the internal surface 23 of the wall 18 of the neck 14 (see FIG. 2a).

The cable-guiding sleeve 10 comprises a fastening ring 26 and the curved conduit 11. The ring 26 comprises a central passage intended for the passage of the cables 4. The ring 26 comprises an essentially tubular wall, centred on the axis of rotation A, with an external surface 27. The ring 26 extends longitudinally between an end connected to the conduit 11 and an end intended to penetrate into the neck 14. Eight protruding ridges 28 are distributed around this external surface 27 about the axis of rotation A. Two neighbouring ridges 28 are spaced apart angularly by 45° about the axis of rotation A. Each ridge 28 extends longitudinally, parallel to the axis of rotation A, over the external surface 27 of the wall of the ring 26.

Figure 5:
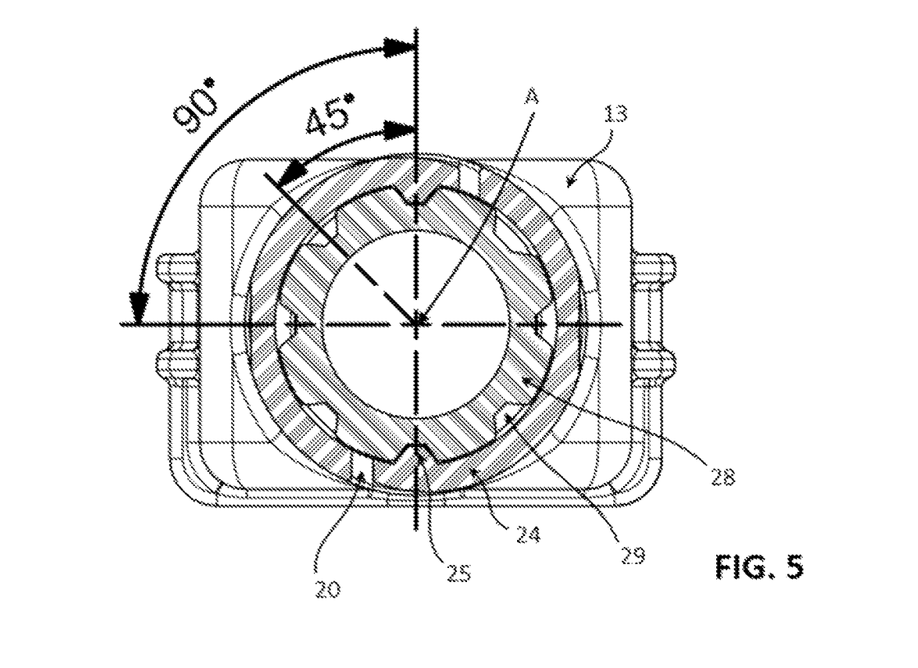
FIG. 5 schematically shows in cross section the blocking means of the shell of the connector shown in FIG. 1.

A notch 29 is provided between two neighbouring ridges 28. Two neighbouring notches 29 are spaced apart angularly by 45° about the axis of rotation A. The notches 29 and the teeth 25 have shapes that engage with each other in a complementary way (see also FIG. 5). The fact that the teeth 25 are located on flexible blocking tabs 24 allows the teeth 25 to release from the notches 29, when the cable-guiding sleeve 10 is moved rotationally about the axis of rotation A, with respect to the fastening segment 13, in order to allow passage from one angular position to the next. The ridges 28, the notches 29 and the teeth 25 on the blocking tabs 24 form means for blocking the rotation of the cable-guiding sleeve 10 on the cover 9 in eight different pre-set angular positions.

In proximity to the end intended to penetrate into the neck 14, the ring 26 comprises a circular locking bead 30 that is coaxial with the axis of rotation A and that protrudes from the external surface 27 of the wall of the ring 26. The locking bead 30 comprises two orientation recesses 31. These two recesses 31 are radially opposite with respect to the axis of rotation A. Each of these recesses 31 is aligned, along a direction parallel to the axis of rotation A, with a notch 29 located between two ridges 28. The recesses 31 are essentially in a plane comprising the axis of rotation A. This plane is perpendicular to the direction of the segment of the conduit 11 corresponding to its free end 33. Each recess 31 is designed to allow the passage of one tooth 25 during the insertion of the ring 26 into the neck 14 (see FIG. 3a). The locking bead 30 comprises a surface 36 perpendicular to the axis of rotation A, this surface being directed toward the fastening segment 13. This surface 36 is intended to interact with the locking surface 22 of the locking tabs 21, in order to retain the cable-guiding sleeve 10, mounted on the cover 9.

The ring 26 also comprises a flange 32 at its end connected to the conduit 11. This flange 32 is intended to abut against the edge of the free end of the neck 14, and forms a stop during the insertion of the ring 26 into the neck 14.

The conduit 11 extends longitudinally, with a 90-degrees dog-leg, between the fastening means egress from the ring 26 and a free end 33 at which fastening means 34 are found. The 34 for example comprise two tabs lying facing each other in parallel planes. Each of the two tabs comprises a through-slot 35 for the passage of a cable tie 12 for attaching cables 4 to the conduit 11. The conduit 11 has, in transverse cross section, a "U" shape. At the egress from the ring 26, the conduit 11 is open on one side (left-hand side in FIG. 2) when the recesses 31 are placed in a vertical plane, perpendicular to the largest lateral faces 16 of the fastening segment 13.

An example of a method for mounting the connector shown in FIG. 1 is described below.

In this example of a method, a plurality of electrical contacts are each respectively inserted into a cavity in a connector casing 2, with one cable 4 connected to each of the contacts extending toward a rear face 5 of the casing 2.

Figures 3, 3A:
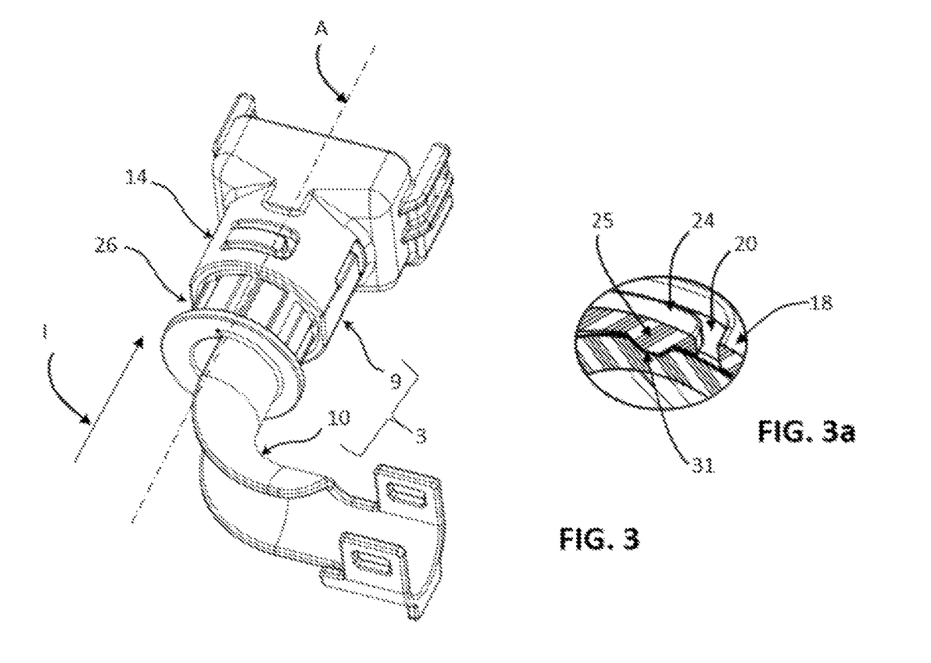
FIG. 3 schematically shows, in perspective, the shell of the connector shown in FIG. 1, during mounting of the cable-guiding sleeve on the cover.
FIG. 3a is an enlarged view of a tooth in the orientation recess.

The cover 9 and the cable-guiding sleeve 10 are mounted together to form a connector shell 3 (see FIG. 3). After insertion, in an insertion direction I parallel to the axis of rotation A, of the ring 26 into the neck 14, the locking surface 22 interacts with the surface 36 of the locking bead 30 to retain the cable-guiding sleeve 10 on the cover 9, when a force is exerted, on the cable-guiding sleeve 10, in a direction opposite to the insertion direction I (see FIGS. 4 and 4a).

Figure 7:
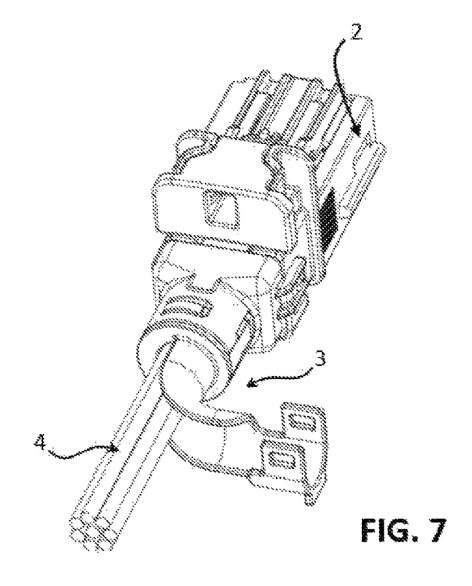
FIG. 7 schematically shows in perspective another step of the method for mounting the shell on the connector shown in FIG. 1, which is carried out subsequent to the step illustrated in FIG. 6.
Figure 8:
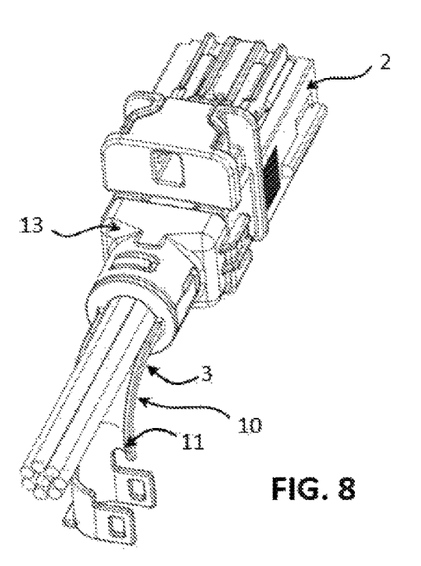
FIG. 8 schematically shows in perspective the cable-guiding sleeve of the shell mounted on the connector of FIG. 1, but turned 90° downward.
Figure 9:
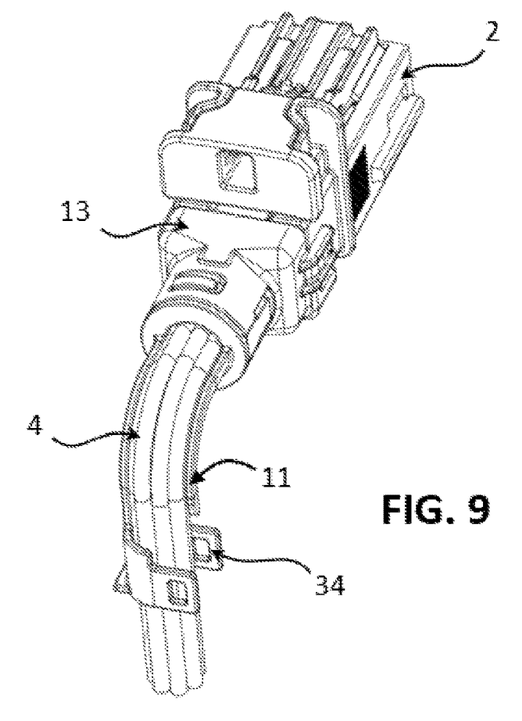
FIG. 9 schematically shows in perspective a cable routed and attached to a cable-guiding sleeve such as illustrated in FIG. 8.

The connector shell 3 is then mounted on the casing 2 (care having been taken to pass beforehand the cables 4 through the interior of the cover 9 and of the ring 26 (see FIGS. 6 and 7)). The cables 4 are essentially arranged parallel to the axis of rotation A. Next, the cable-guiding sleeve 10 is placed in one of the pre-set angular positions (see FIG. 8) by rotating the cable-guiding sleeve 10, about the axis of rotation A, with respect to the fastening segment 13. During this rotation, the teeth 25 pass from one notch 29 to the next with not entirely easy passage over a ridge 18 between two notches 29. The cable-guiding sleeve 10 is blocked and stabilized in the desired angular position by virtue of the interaction of each of the teeth 25 with a notch 29. The cables 4 are then placed in the curved conduit 11 (see FIG. 8) and they are attached thereto by virtue of the fastening means 34 and a cable tie 12 (see FIG. 1).

Another example of embodiment of the connector 1 is shown on FIGS. 10 to 13. The description of the components and features which are identical or similar to those already described in connection with the first embodiment will not be repeated. According to this other embodiment, the connector 1 comprises a casing 2 and a connector shell 300.

Figure 13:
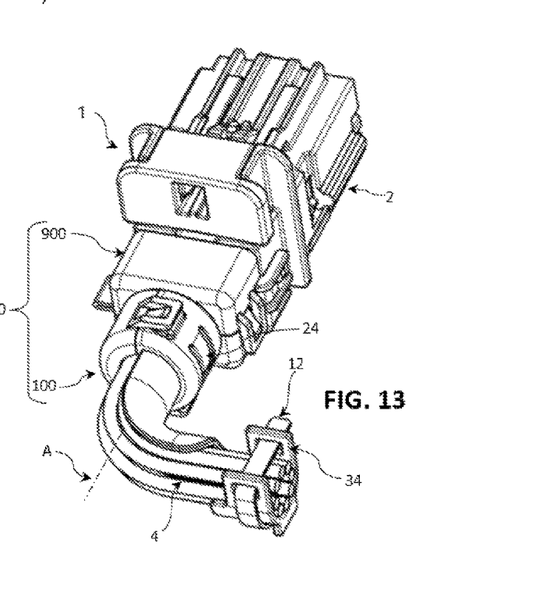
FIG. 13 schematically shows another portion of a process of mounting an example of embodiment of a connector.

As shown on FIG. 13, the connector shell 300 comprises a connector cover 900 and a cable-guiding sleeve 100. This embodiment has the advantage that the connector cover 900 and the cable-guiding sleeve 100 can be mounted onto the connector 1, even if the terminals cables 4 are already attached to terminals and that these terminals are already accommodated in the corresponding cavities of the casing 2.

Figure 10:
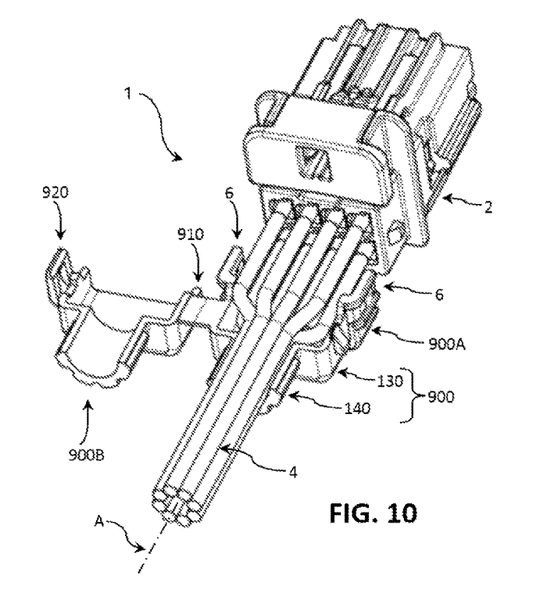
FIG. 10 schematically shows a portion of a process of mounting an example of embodiment of a connector.

As shown on FIG. 10, the cover 900 comprises a fastening segment 130 and a neck 140. The cover 900 comprises two cover halves 900A, 900B, each cover half 900A, 900B comprising one half of the fastening segment 130 and one half of the neck 140. The two cover halves 900A, 900B are connected by a hinge 910 located on a lateral face comprising a fastening tab 6. The two cover halves 900A, 900B are attached together when the cover 900 is closed around the cables 4 by the virtue of a locking means 920. The locking means 920 is located on a lateral face opposite, with regard to the rotational axis A, to the lateral face comprising the hinge 910. The locking means 920 comprises a flexible tab, located on one of the cover halves 900A, 900B, with a window adapted to interact with a complementary protuberance, located on the other one of the cover halves 900A, 900B.

Figure 11:
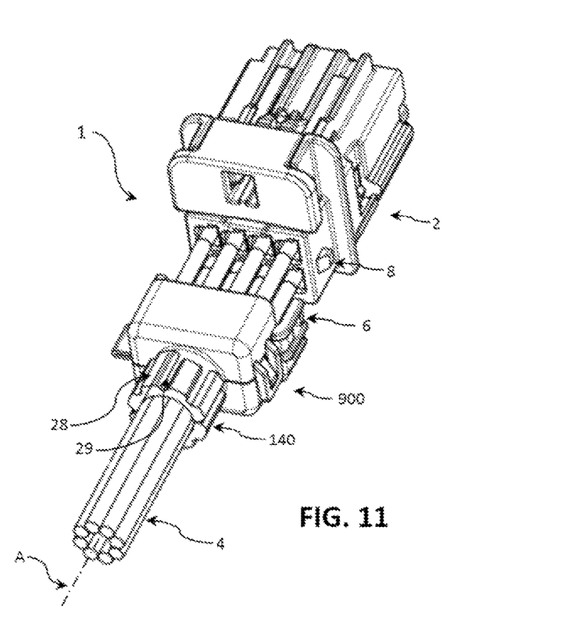
FIG. 11 schematically shows another portion of a process of mounting an example of embodiment of a connector.

As shown on FIG. 11, once the cover 900 is closed, the neck 140 presents a series of ridges 28 and notches 29 similar to those described in connection with the ring 26 of the previous embodiment.

Figure 12:
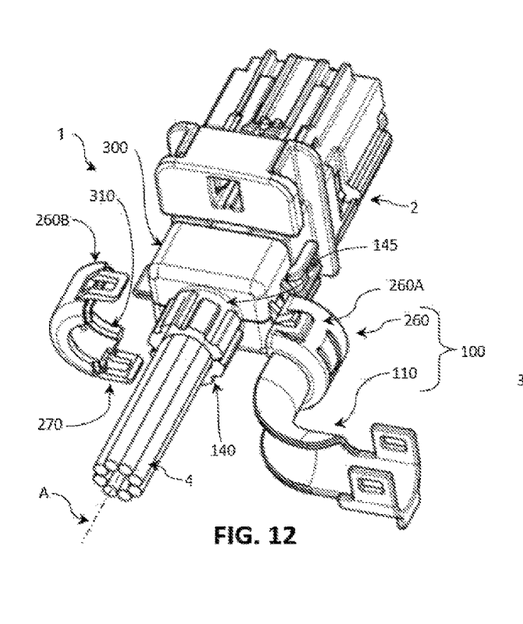
FIG. 12 schematically shows another portion of a process of mounting an example of embodiment of a connector.

As shown on FIG. 12, the cable-guiding sleeve 100 comprises a curved conduit 110 similar to the curved conduct 10 already described in connection with the previous embodiment. The cable-guiding sleeve 100 also comprises a fastening collar 260. The fastening collar 260 comprises two collar halves 260A, 260B. One of the collar halves 260A, 260B is made in one piece with the curved conduct 110. The other of the collar halves 260A, 260B is made as a separate piece. However, in a variant, the two collar halves 260A, 260B could be linked with a hinge similar to the hinge 910. Each collar half 260A, 260B is essentially shaped as an arcuate portion extending over 180° around the rotation axis A. Each collar half 260A, 260B comprises a bead 310 which can rotatably engage a circular groove 145 of the neck 140 so as to retain and rotatably guide the cable-guiding sleeve 100 over the cover 900.

The two collar halves 260A, 260B are attached together when the cable-guiding sleeve 100 is mounted around the cables 4 by the virtue of a locking means 270 similar to the locking means 920 already described in connection with the cover 900.

For mounting the connector shell 300 on the casing 2, cables 4 egressing from the casing 2 are accommodated in a first one of the cover halves 900A, 900B (see FIG. 10). The second one of the cover halves 900A, 900B is then closed over the cables 4 and the locking means 920 are engaged in one another (see FIG. 11). The closed cover 900 is pushed toward the casing 2 so as to engage each fastening tabs 6 with a corresponding protuberance 8 and to fasten the cover 900 on the casing 2. Then, the two collar halves 260A, 260B are attached together around the neck 140 (see FIG. 12). The cable-guiding sleeve 100 can be rotated around the rotation axis A and blocked in a particular position around the rotation axis A by virtue of the teeth of the blocking tabs 24 engaging notches. The cables 4 are bent and attached to the conduit 110 with fastening means 34 and a cable tie 12.

The connector 1, and the mounting methods, have been described above with reference to an electrical connector, but their description is wholly applicable and transposable to an optical connector.

The preceding description is exemplary rather than limiting in nature. Variations and modifications to the disclosed examples may become apparent to those skilled in the art and do not necessarily depart from the essence of this invention. The scope of legal protection given to this invention can only be determined by studying the following claims.

We claim:

1. A connector shell, comprising:
   a cover; and
   a cable-guiding sleeve comprising a curved conduit, wherein
   the cover is adapted to be mounted at a rear of a connector,
   the cover and the cable-guiding sleeve are made up of at least two separate elements,
   the cable-guiding sleeve is mounted on the cover so as to be rotatable about an axis of rotation essentially perpendicular to a rear face of the connector,
   the cable-guiding sleeve or the cover comprises at least two notches,
   the other of the cable-guiding sleeve or the cover comprises a blocking tab including a tooth configured to interact with the notches in a complementary way for blocking rotation of the cable-guiding sleeve on the cover in at least two different pre-set angular positions about the axis of rotation,
   the blocking tab biases the tooth into engagement with the notches in the complementary way, the blocking tab extending between a fixed end and a free end that is equipped with the tooth, the tooth configured to be elastically connected by the fixed end of the blocking tab to the other of the cable-guiding sleeve or the cover, and
   the tooth and the notches are configured to release each other and allow passage between the at least two different pre-set angular positions.

2. The connector shell according to claim 1, wherein the cable-guiding sleeve comprises a ring,
   the cover comprises a neck,
   the ring and the neck are coaxial with the axis of rotation,
   the ring includes the notches, and
   the tooth protrudes from an internal surface on the neck.

3. The connector shell according to claim 1, wherein the cable-guiding sleeve comprises eight notches,
   the notches are each formed between two corresponding ridges on the cable-guiding sleeve, and
   wherein two neighboring notches of the notches are spaced apart angularly by 45° about the axis of rotation.

4. The connector shell according to claim 1, wherein the cover comprises a neck,
   the neck comprises eight notches,
   each notch is formed between two ridges on the neck, and
   the two neighboring notches are spaced apart angularly by 45° about the axis of rotation.

5. The connector shell according to claim 1, wherein the cover comprises two cover halves.

6. The connector shell according to claim 1, wherein the cable-guiding sleeve comprises a fastening collar with two collar halves.

7. The connector shell according to claim 1, wherein the cable-guiding sleeve comprises fastening means designed to attach a plurality of cables all together in the curved conduit with a cable tie.

8. The connector shell according to claim 1, wherein the cover comprises a segment for fastening to a connector casing including an essentially rectangular cross-section that is perpendicular to the axis of rotation.

9. The connector shell according to claim 1, wherein
   the cover comprises a face for entry and a face for egress of cables,
   the faces are situated essentially perpendicular to the axis of rotation,
   the cable-guiding sleeve comprises an entry face for entry of the cables,
   the entry face is situated essentially perpendicular to the axis of rotation,
   the cable-guiding sleeve comprises an egress face for egress of the cables, and
   the egress face is essentially perpendicular to the entry face.

10. A connector comprising:
    the connector shell according to claim 1 including flexible fastening tabs equipped with windows and
    a casing including complementary protuberances that interact with the windows to retain the connector shell on the casing in a fixed position.

11. A method of connecting a connector with the connector shell according to claim 1, the method comprising:
    inserting a plurality of electrical contacts respectively into a cavity in a casing of the connector;
    connecting each of the contacts to a cable extending to a rear face of the casing;
    mounting the connector shell on the casing with the cables passing through an interior of the cover essentially parallel to the axis of rotation;
    placing the cable-guiding sleeve in a desired one of the pre-set angular positions such that the cable-guiding sleeve is blocked and stabilized in the desired angular position by the teeth being biased into interaction with one of the notches; and
    placing the cables in the curved conduit.

12. A connector shell, comprising:
    a cover; and
    a cable-guiding sleeve comprising a curved conduit, wherein
    the cover is adapted to be mounted at a rear of a connector,
    the cover and the cable-guiding sleeve are made up of at least two separate elements,
    the cable-guiding sleeve is mounted on the cover so as to be rotatable about an axis of rotation essentially perpendicular to a rear face of the connector,
    the cable-guiding sleeve or the cover comprises at least two notches,
    the other of the cable-guiding sleeve or the cover comprises a blocking tab including a tooth configured to interact with the notches in a complementary way for blocking rotation of the cable-guiding sleeve on the cover in at least two different pre-set angular positions about the axis of rotation,
    the blocking tab biases the tooth into engagement with the notches in the complementary way, the blocking tab extending between a fixed end and a free end that is equipped with the tooth, the tooth configured to be elastically connected by the fixed end of the blocking tab to the other of the cable-guiding sleeve or the cover, and the tooth and the notches are configured to release each other and allow passage between the at least two different pre-set angular positions, the cable-guiding sleeve comprises a ring, the cover comprises a neck, the ring and the neck are coaxial with the axis of rotation, the ring includes the notches, and the tooth protrudes from an internal surface on the neck, wherein the cable-guiding sleeve comprises a circular locking bead that is coaxial with the axis of rotation, the cover comprises at least one flexible locking tab equipped with a locking surface that retracts during insertion in an insertion direction parallel to the axis of rotation of the ring into the neck along a direction parallel to the axis of rotation, and the locking surface interacts with the locking bead to retain the cable-guiding sleeve on the cover against removal in response to a force exerted on the cable-guiding sleeve in a direction opposite to the insertion direction.

13. The connector shell according to claim 12, wherein the locking bead comprises at least one orientation recess aligned along a direction parallel to the axis of rotation for the passage of the tooth during the insertion of the ring into the neck.

* * * * *